(12) United States Patent
Silva

(10) Patent No.: US 7,018,547 B1
(45) Date of Patent: Mar. 28, 2006

(54) FILTRATION COVERING APPARATUS

(76) Inventor: Robert Silva, 12202 Gathering Pl. Apt F, Miraloma, CA (US) 91752

( * ) Notice: Subject to any disclaimer, the term of this patent is extended or adjusted under 35 U.S.C. 154(b) by 0 days.

(21) Appl. No.: 10/992,506

(22) Filed: Nov. 18, 2004

(51) Int. Cl.
*B01D 37/02* (2006.01)

(52) U.S. Cl. .................. 210/777; 210/169; 210/193; 210/416.2

(58) Field of Classification Search ................ 210/777, 210/778, 169, 193, 416.1, 416.2
See application file for complete search history.

(56) References Cited

U.S. PATENT DOCUMENTS

| | | | | |
|---|---|---|---|---|
| 2,693,246 A | * | 11/1954 | Marcheck | 55/482 |
| 3,178,021 A | * | 4/1965 | Bray | 210/771 |
| 4,022,695 A | * | 5/1977 | Howard et al. | 210/486 |
| 4,051,033 A | * | 9/1977 | Blace | 210/193 |
| 4,156,601 A | * | 5/1979 | Pieciak | 55/367 |
| 4,622,137 A | | 11/1986 | Kessler | 210/169 |
| 4,776,958 A | * | 10/1988 | Stephenson | 210/486 |
| 4,944,887 A | | 7/1990 | Frederick | 210/778 |
| 5,397,465 A | | 3/1995 | Stewart | 210/169 |
| 6,196,395 B1 | * | 3/2001 | Drori | 210/412 |

FOREIGN PATENT DOCUMENTS

GB         2020187          * 11/1979

* cited by examiner

*Primary Examiner*—Fred G. Prince
(74) *Attorney, Agent, or Firm*—Goldstein Law Offices P.C.

(57) ABSTRACT

A filtration covering apparatus for use covering diatomaceous earth filter grids for swimming pools. The filtration covering apparatus has a replaceable cover having two closed sides, a bottom opening, and a top opening. The replaceable cover is curved shaped to accommodate the filter grid. The filter grid fits within the top opening of the replaceable cover. The top opening includes a horizontal top edge having a zipper mechanism for securing the top opening closed for containing the filter grid therein.

6 Claims, 2 Drawing Sheets

FILTRATION COVERING APPARATUS

BACKGROUND OF THE INVENTION

The invention relates to a filtration cover, and more particularly, to a filtration covering apparatus useful with diatomaceous earth filter grids for swimming pools, for providing a more convenient, cost-effective means of maintaining filtering systems.

An activity that is both aerobic and relaxing, swimming is enjoyed by adults and children alike. Many would confess that there is no feeling that can surpass diving into a cool, clear pool of water on a hot day, propelling the body through the calming depths or cutting across the yielding, inviting surface. In addition to the joys experienced while merrily splashing or leisurely floating in a swimming pool, this fun-filled sport also provides a valuable means of exercise. Aiding the development of strength, flexibility, and endurance, swimming also helps participants to achieve and maintain adequate cardiovascular fitness. Whether they wish to improve their physical health or simply desire to enjoy the calming affects of the water, many people jump at the chance to take a swim at every possible opportunity.

While a swimming pool is a great place to relax, cool off, and exercise, pool owners must remember that maintenance is an important part of keeping their investment sparkling clean for years of enjoyment. Maintaining the pool and keeping it in good shape is much easier than clearing up more serious problems later on. Clean water and balanced water chemistry are the keys to pool maintenance, and professionals highly recommend establishing a weekly routine to clean the pool and maintain the chemical balance. This is the best way to eliminate problems with the water, such as foul odors, algae growth, eye and skin irritations, and murky, slimy water. A key element in achieving this that is frequently overlooked in its importance is filtration, which refers to the mechanical cleaning of pool water. These particles of dirt and debris are the result of environmental fallout or are left behind by the bathers and, when not properly filtered out, will cause the water to become hazy or cloudy. Many pool professionals consider diatomaceous earth filtration to be the finest, because it is capable of removing smaller particles than either sand or cartridge. Diatomaceous earth is a porous powder with microscopic openings, that, when magnified, look like tiny sponges. Clear water can pass through these openings, but particles, as small as one to three microns, are trapped the first pass through the media. All diatomaceous earth filters have internal elements that become coated with diatomaceous earth, and it is this "filter cake" that strains dirt, dust, algae, and some forms of bacteria from the water.

U.S. Pat. No. 4,944,887 to Frederick discloses a diatomaceous earth filter that can be regenerated by reciprocating the screen in the casing. U.S. Pat. No. 4,622,137 to Kessler and U.S. Pat. No. 5,397,456 to Stewart disclose various filtering system for swimming pools.

While these units may be suitable for the particular purpose employed, or for general use, they would not be as suitable for the purposes of the present invention as disclosed hereafter.

SUMMARY OF THE INVENTION

It is an object of the invention to produce a more simple and effective means of maintaining diatomaceous earth filter grids for swimming pools. Accordingly, the invention is a replaceable cover that fits over a filter grid for collecting debris and is a simple and effective means of maintaining diatomaceous earth filter grids for swimming pools.

It is another object of the invention to provide a conveniently removable cover. Accordingly, the replaceable cover has a top opening have a horizontal top edge having a zipper mechanism for easily confining the grid within the replaceable cover and easily and conveniently unzipping to remove and replace the replaceable cover therefrom.

It is another object of the invention to provide a more cost-effective filtration covering apparatus. Accordingly, the replaceable cover is so easily removed and replaced that time is saved on repair and therefore more cost-effective.

This invention is a filtration covering apparatus for use covering diatomaceous earth filter grids for swimming pools. The filtration covering apparatus has a replaceable cover having two closed sides, a bottom opening, and a top opening. The replaceable cover is curved shaped to accommodate the filter grid. The filter grid fits within the top opening of the replaceable cover. The top opening includes a horizontal top edge having a zipper mechanism for securing the top opening closed for containing the filter grid therein.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
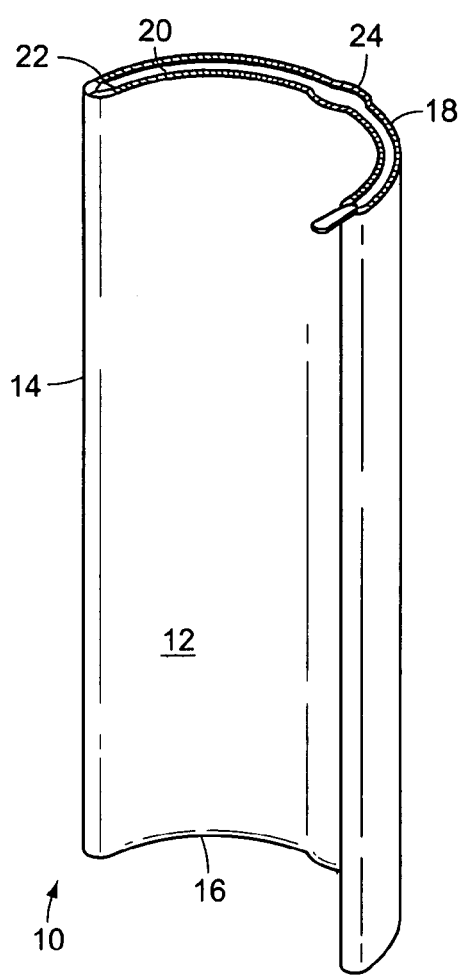
FIG. 1 is a diagrammatic perspective view of the filtration covering apparatus of the present invention having a replaceable cover for use covering diatomaceous earth filter grids for swimming pools.
Figure 3:
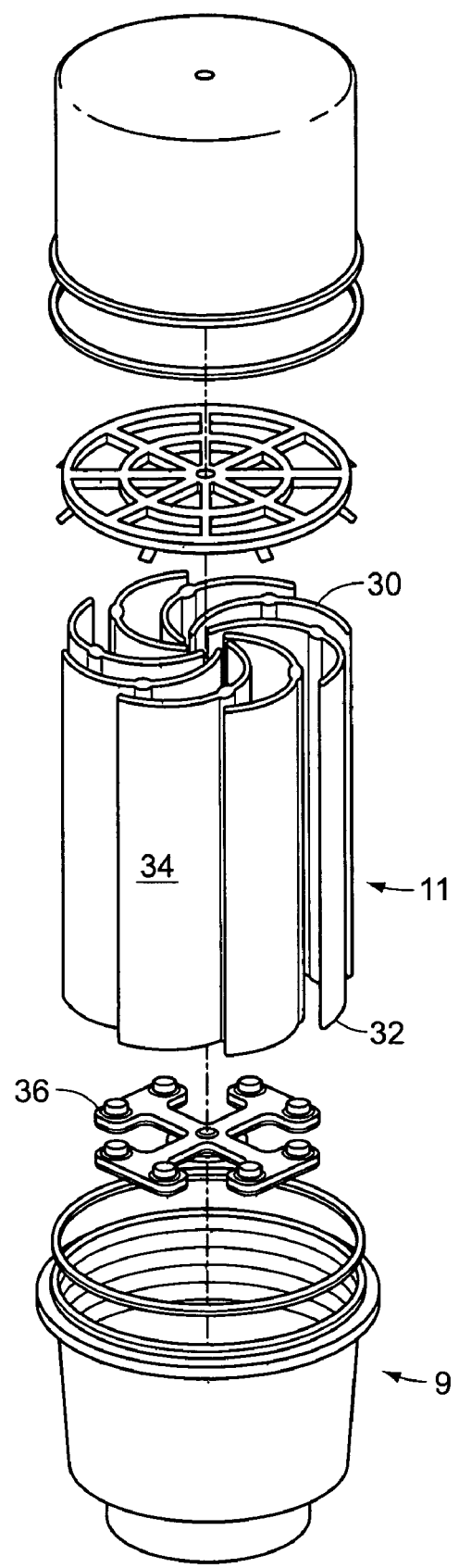
FIG. 3 is a diagrammatic perspective view of the filtration covering apparatus of the present invention in use covering the filter grid, shown within a filtering system, having a filter connector.

FIG. 1 illustrates a filtration covering apparatus 10 of the present invention for use covering diatomaceous earth filter grids for swimming pools, for providing a more convenient, cost-effective means of maintaining filtering systems. In FIG. 3, the diatomaceous earth filters 11 each have eight filter grids 30, substantially curved, each having a width 32, and each having a skeleton fabric-type liner cover 34. The diatomaceous earth filters all have a filter connector 36 attached to the filter grids 30. For the filtering system 9 to operate most effectively, all eight filter grids 30 and fabric-type lining covers 34 must be in excellent condition. If one of the filter grids 30 becomes damaged or torn through then the filter grid 30 needs to be replaced immediately to keep the pool in good clean condition. Currently, to repair the filter grid 30 a new one must be purchased at a high cost and much time and effort and is then required to replace. The filtration covering apparatus 10, which can be kept on site, solves this problem and saves space, time, and money.

Tin FIG. 1, the filtration covering apparatus 10 includes a replaceable cover 12, preferably made of a durable, polypropylene fabric material, generally rectangular in shape. The replaceable cover 12 has two closed sides 14, a bottom opening 16, and a top opening 18. The replaceable cover 12 is curved shaped in order to accommodate the curvature of the filter grids. An interior 20 of the replaceable cover is reached through the top opening 18. The two sides 14 are sized to accommodate virtually any filter brand. The bottom opening 16 is sized to accommodate the width of each of the filter grids and allow the filter connector access to the filter grids.

The top opening 18 includes a horizontal top edge 24. The horizontal top edge 24 has a zipper mechanism 22 for securing the top opening 18 closed once positioned on one of the filter grids.

Figure 2:
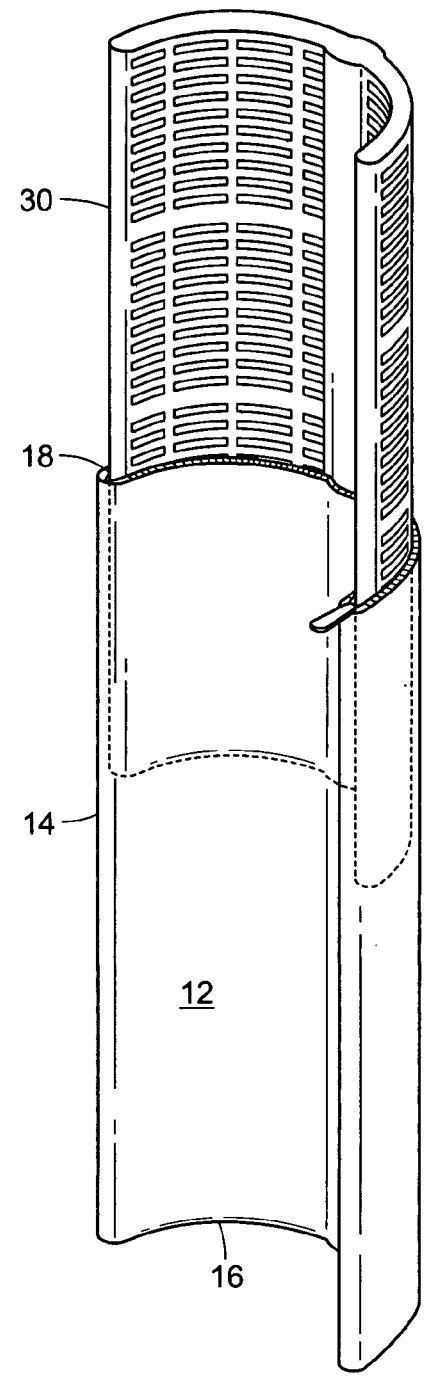
FIG. 2 is diagrammatic perspective view of the filtration covering apparatus of the presenting invention being inserted over the filter grid.

FIG. 2 illustrates the replaceable cover 12 in use covering the filter grid 30. First, a user removes the skeleton fabric-type liner cover from the filter grid 30. Next, the filter grid 30 is inserted within the interior of the replaceable cover 12 at the top opening 18. The two closed sides 14 of the replaceable cover 12 extend upwardly to accommodate the filter grid 30 within the interior. The bottom opening 16 ensures that the filter grid 30 is accessible to the filter connector 36 therethrough, as shown in FIG. 3. Once in position, the user secures the top opening 18 closed by zipping the zipper mechanism therealong. The filter grid 30 is now securely confined within the interior of the replaceable cover 12, as shown in FIGS. 1 and 3. This process is then repeated for the remaining filter grids 30.

During regular pool maintenance, should the user notice that the replaceable covering 12 is damaged or has collected with debris, the user need only unzip the zipping mechanism 22 and slide off the replaceable cover 12 from the filter grid 30 and replace with a new replaceable cover, without having to replace the filter grid 30 itself. After use, the replaceable cover 12 can alone be conveniently discarded.

In conclusion, herein is presented a filtration covering apparatus for use with diatomaceous earth filter grids for swimming pools. The invention is illustrated by example in the drawing figures, and throughout the written description. It should be understood that numerous variations are possible, while adhering to the inventive concept. Such variations are contemplated as being a part of the present invention.

What is claimed is:

1. A filtration covering apparatus for use covering diatomaceous earth filter grids for swimming pools, for providing a more convenient, cost-effective means of maintaining filtering systems, the diatomaceous earth filters each have eight filter grids, substantially curved, a width, and attach to a filter connector, comprising:

a replaceable cover substantially curved having two closed sides, a bottom opening, a top opening, and an interior for accommodating the curved filter grid, the top opening having a horizontal top edge having a zipper mechanism for securing the top opening closed once positioned on the filter grid, the bottom opening sized to accommodate the width of each of the filter grids and allow the filter connector access to the filter grids.

2. A filtration covering apparatus for use covering diatomaceous earth filter grids for swimming pools, for providing a more convenient, cost-effective means of maintaining filtering systems, the diatomaceous earth filters each have eight filter grids, substantially curved, a width, and attach to a filter connector, comprising:

a replaceable cover substantially curved having two closed sides, a bottom opening, a top opening, and an interior for accommodating the curved filter grid therein.

3. The filtration covering apparatus of claim 2, wherein the top opening has a horizontal top edge having a zipper mechanism for securing the top opening closed once positioned on the filter grid.

4. The filtration covering apparatus of claim 3, wherein the bottom opening is sized to accommodate the width of each of the filter grids and allow the filter connector access to the filter grids.

5. A method of maintaining a swimming pool filtration system, having a filter connector, using a filtration covering apparatus covering diatomaceous earth filter grids with skeleton fabric-type liner covers, the filtration covering apparatus having a replaceable cover substantially curved having two closed sides, a bottom opening, a top opening, and an interior for accommodating the filter grid, the top opening having a horizontal top edge having a zipper mechanism for securing the top opening closed once positioned on the filter grid, the steps comprising:

(a) removing the skeleton fabric-type liner cover from the filter grid;

(b) inserting the filter grid within the interior of the replaceable cover at the top opening, by extending upwardly the two closed sides to accommodate the filter grid within the interior, ensuring that the filter grid is accessible to the filter connector through the bottom opening; and (c) securely confining the filter grid within the interior of the replaceable cover by securing the top opening closed by zipping the zipper mechanism.

6. The method of maintaining a swimming pool filtration system of claim 5, the steps further comprising, repeating steps (a) through (c) for the remaining filter grids.

* * * * *